United States Patent [19]

Corpora et al.

[11] Patent Number: 5,491,732
[45] Date of Patent: * Feb. 13, 1996

[54] NUCLEAR REACTOR PRIMARY SYSTEM CHEMICAL DECONTAMINATION CLEAN-UP SYSTEM COMPONENT ARRANGEMENT

[75] Inventors: Gary J. Corpora, Monroeville; Phillip E. Miller, Greensburg; Thomas G. Bengel, Plum Borough; Frank I. Bauer, Perry Township, Lawrence County; Dan H. Dixon, N. Huntingdon; James Sejvar, Murrysville, all of Pa.

[73] Assignee: Westinghouse Electric Corporation, Pittsburgh, Pa.

[*] Notice: The portion of the term of this patent subsequent to Jun. 28, 2011, has been disclaimed.

[21] Appl. No.: 989,420

[22] Filed: Dec. 11, 1992

[51] Int. Cl.⁶ .................................................. G21C 19/28
[52] U.S. Cl. .......................... 376/313; 376/310; 376/287
[58] Field of Search ................................. 376/310, 313, 376/308, 305, 287

[56] References Cited

U.S. PATENT DOCUMENTS

| | | | |
|---|---|---|---|
| 3,873,362 | 3/1975 | Mihram et al. ............................. 134/3 |
| 3,890,233 | 6/1975 | Gischel .................................... 210/237 |
| 3,895,465 | 7/1975 | Korn et al. ................................ 51/320 |
| 4,042,455 | 8/1977 | Brown ..................................... 376/313 |
| 4,623,510 | 11/1986 | Troy ....................................... 376/313 |
| 5,024,805 | 6/1991 | Murray .................................... 376/313 |
| 5,089,216 | 2/1992 | Schlonski et al. ...................... 376/308 |
| 5,089,217 | 2/1992 | Corpora et al. ......................... 376/313 |
| 5,139,734 | 8/1992 | Copora et al. .......................... 376/313 |
| 5,171,519 | 12/1992 | Corpora et al. ......................... 376/313 |
| 5,325,410 | 6/1994 | Corpora et al. ......................... 376/313 |

*Primary Examiner*—Daniel D. Wasil
*Attorney, Agent, or Firm*—Joseph C. Spadalene

[57] ABSTRACT

A nuclear reactor having a chemical decontamination clean-up system is provided in which every component of the chemical decontamination clean-up equipment which processes radioactive fluids is located within a shielded room of an existing on-site support building. Those components of the clean-up system not in direct contact with radioactive fluids are housed in portable trailers. The decontamination clean-up system is designed to provide for adequate shielding to minimize personnel exposure and also incorporates a modular design for component transportation and storage.

8 Claims, 2 Drawing Sheets

NUCLEAR REACTOR PRIMARY SYSTEM CHEMICAL DECONTAMINATION CLEAN-UP SYSTEM COMPONENT ARRANGEMENT

BACKGROUND OF THE INVENTION

1. Field of the Invention

The present invention relates generally to the field of nuclear reactor primary system decontamination and, more particularly, to a scheme for locating components forming a clean-up system utilized to remove suspended and dissolved solids from nuclear reactor primary system fluids after the primary system has been subjected to a chemical decontamination process.

2. Description of the Prior Art

The problem of excessive personnel exposures caused by high background radiation levels in a nuclear reactor primary system, such as in a pressurized water reactor (PWR) system, and the resultant economic cost of requiring personnel rotation to minimize individual exposure is significant at many nuclear plants. These background levels are principally due to the build-up of corrosion products in certain areas of the plant. The build-up of corrosion products exposes workers to high radiation levels during routine maintenance and refueling outages.

As a nuclear power plant operates, the surfaces in the core and other portions of the primary system corrode. Corrosion products, referred to as "crud", are activated by transport of the corroded material to the core region by the reactor coolant system. Subsequent release of the activated crud and redeposition elsewhere in the system produces radiation fields in piping and components throughout the primary system, thus increasing radiation levels throughout the plant. The activity of the corrosion product deposits is predominantly due to cobalt 58 and cobalt 60. It is estimated that between 80% and 90% of personnel radiation exposure can be attributed to these elements.

One way of controlling worker exposure, and of dealing with this problematic situation, is to periodically decontaminate the nuclear steam supply system using chemicals, thereby removing a significant fraction of the corrosion product oxide films. Early techniques did very little to decontaminate the primary system as a whole, typically focusing only on the heat exchanger (steam generator) channel heads.

Two different chemical processes, referred to as LOMI (developed in England under a joint program by EPRI and the Central Electricity Generating Board) and CAN-DEREM (developed by Atomic Energy of Canada, Ltd.), were initially suggested for small scale decontamination. These processes are multi-step operations, in which various chemicals are injected, recirculated, and then removed by ion exchange. Although the chemicals are designed to dissolve the corrosion products, some particulates are also generated. Another method of chemical decontamination which focuses on the chemistry of decontamination is disclosed in U.K. Patent Application No. GB 2 085 215 A (Bradbury et al.).

While these chemical processes were initially used only on a localized basis, the use of these chemical processes has now been considered for application on a large scale, full system chemical decontamination. Such an application is disclosed generally in U.S. Pat. No. 5,089,216, assigned to the assignee of the present invention and entitled "System for Chemical Decontamination of Nuclear Reactor Primary Systems".

The estimated collective radiation dose savings over a 10-year period following nuclear reactor primary system decontamination is on the order of 2,500–4,500 man rem, depending upon whether or not the fuel is removed during decontamination. At any reasonable assigning of cost per man rem, the savings resulting from reduced dosage levels will be in the tens of millions of dollars.

As a result of the recognition that full nuclear reactor primary system chemical decontamination is indeed possible from a technical standpoint, and more importantly, advantageous in order to increase collective radiation dose savings, systems have been suggested for effective and economic removal of dissolved and particulated corrosion products generated by the application of these known chemical decontamination techniques. One such system is disclosed in U.S. Pat. No. 5,089,217, assigned to the assignee of the present invention and entitled "Clean-up Sub-System for Chemical Decontamination of Nuclear Reactor Primary Systems". In this sub-system, chemically processed fluids containing suspended and dissolved solids are directed first through a back-flushable filter and, thereafter, through one or more cartridge filters. After this initial filtering of suspended solids, these fluids are directed to one or more banks of demineralizers for removal of dissolved solids, followed by additional cartridge filtering to remove any resin fines carried out of the demineralizer banks. After final filtering, the fluids are returned to the primary system. The clean-up sub-system described in this patent requires that the resin beds within each of the demineralizers be replaced at least once during the chemical decontamination clean-up process. U.S. patent application Ser. No. 07/630,049, filed Dec. 19, 1990, now U.S. Pat. No. 5,171,519, entitled "Outside of Containment Chemical Decontamination System for Nuclear Reactor Primary Systems" and assigned to the assignee of the present invention, teaches locating the components of the chemical decontamination clean-up system outside of containment in a specially constructed, shielded building.

U.S. patent application Ser. No. 07/983,503, filed Nov. 30, 1992, now U.S. Pat. No. 5,325,410, entitled "Clean-up System for the Chemical Decontamination of a Nuclear Reactor Primary System", assigned to the assignee of the present invention and incorporated herein by reference, discloses a clean-up system which improves on prior clean-up systems and effectively and economically removes dissolved and particulated corrosion products from primary system fluids generated by the application of known chemical decontamination techniques. This clean-up system does not require demineralizer resin bed replacement during the decontamination clean-up process. While the equipment forming the improved clean-up system disclosed in U.S. patent application Ser. No. 07/983,503, filed Nov. 30, 1992, now U.S. Pat. No. 5,325,410 may be housed in its own specially constructed decontamination clean-up building as disclosed in patent application Ser. No. 07/630,049 filed Dec. 19, 1990, now U.S. Pat. No. 5,171,519 if building space is readily available, constructing a separate decontamination building complete with necessary shielding, curb retainers and containment drains may not always be preferred due to limited available space and cost limitations.

Therefore, there exists a need for a chemical decontamination clean-up system design layout which utilizes existing available space to house components of the clean-up system and thereby avoids the costs and other logistics difficulties associated with the construction of a separate clean-up building. The design would be an "outside of containment" design in that the various components which constitute the chemical decontamination clean-up process would be installed outside of the nuclear reactor containment chamber.

SUMMARY OF THE INVENTION

The present invention is directed to a nuclear reactor primary system chemical decontamination clean-up system arrangement designed to satisfy the aforementioned need. More specifically, the present invention is directed towards an "outside of containment" chemical decontamination clean-up system which utilizes available space in existing on-site support buildings to house the various components forming the chemical decontamination clean-up system. The present invention provides for locating the various chemical decontamination clean-up system components on modular skids which can be easily installed in existing on-site support buildings when needed and easily removed when not in use. In addition, the present invention provides for locating only those components which handle radioactive fluids within shielded rooms or chambers. The remainder of the clean-up system may be located outside the shielded rooms or chambers.

Accordingly, the present invention is directed to a nuclear reactor including a primary system, a fuel storage building, a primary auxiliary building and a chemical decontamination clean-up system for use in cleaning primary system fluids flowing through the nuclear reactor primary system. The chemical decontamination clean-up system includes (a) a plurality of first demineralizer banks located in the fuel storage building and flow coupled to the nuclear reactor primary system for receiving primary system fluids from the primary system; (b) a second demineralizer bank located in the primary auxiliary building and flow coupled to the plurality of first demineralizer banks for receiving the primary system fluids from the plurality of first demineralizer banks; and (c) a resin trap and filter arrangement located in the primary auxiliary building and flow coupled to the second demineralizer bank for receiving primary system fluids from the second demineralizer bank. After the primary system fluids pass through the resin trap and filter arrangement, they are returned to the nuclear reactor primary system.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
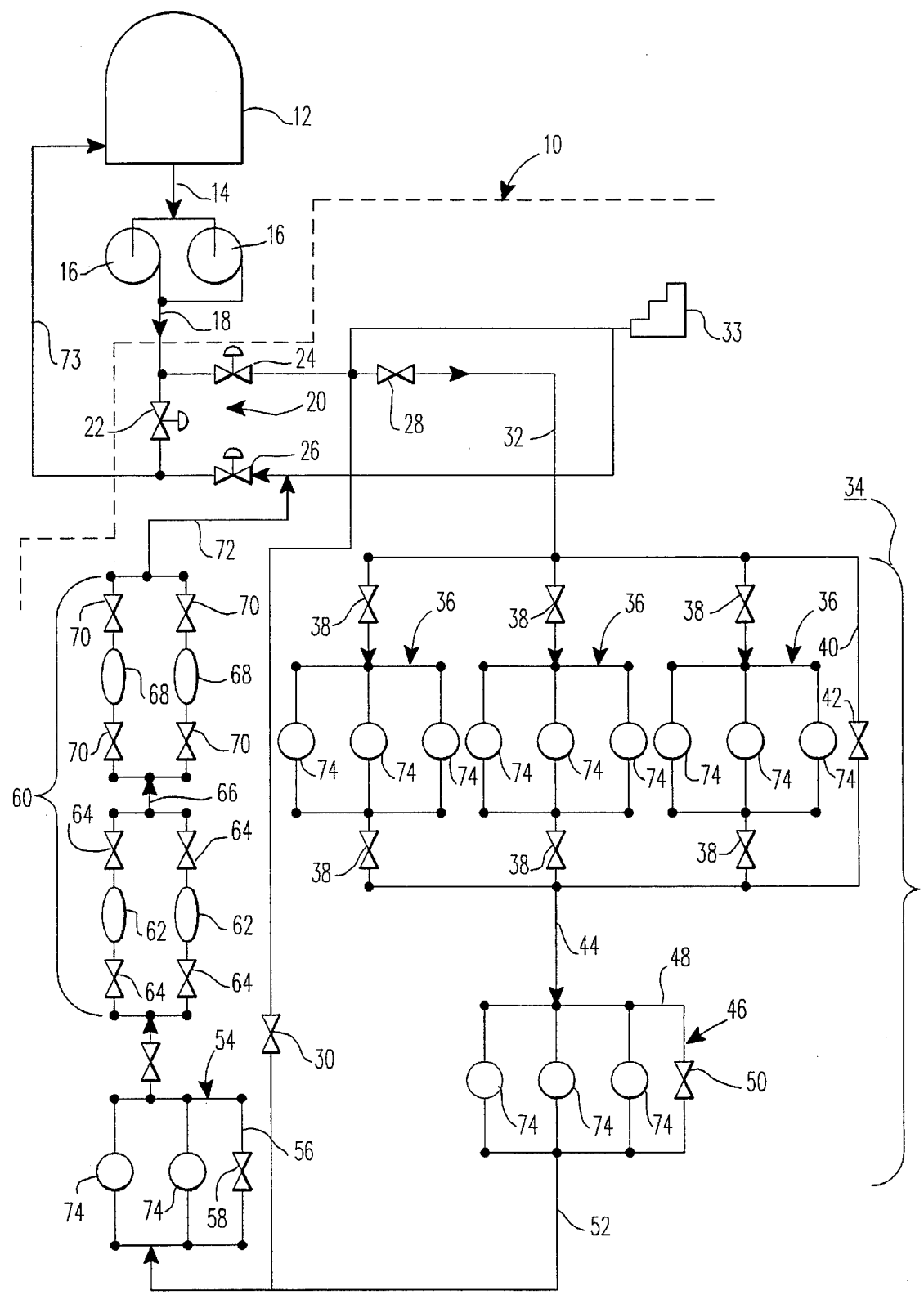
FIG. 1 is a schematic flow diagram illustrating a chemical decontamination clean-up system for removing suspended and dissolved solids from nuclear reactor primary systems fluids after the primary system has been subjected to a chemical decontamination process.

Referring now to the drawings, and particularly to FIG. 1, there is illustrated a schematic flow diagram of a decontamination clean-up system operable in conjunction with the chemical decontamination of a nuclear reactor primary system to remove dissolved and suspended solids from the fluids flowing through the nuclear reactor primary system. The decontamination clean-up system, which is generally designated by the numeral 10, is operable to receive primary system fluids circulating through a nuclear reactor primary system or containment chamber such as schematically illustrated by the numeral 12 and remove suspended and dissolved solids from the fluids generated as a result of the primary system being subjected to a conventional chemical decontamination process. The primary system fluids containing the suspended and dissolved solids are introduced into the clean-up system 10 via piping 14 and a pair of residual heat removal (RHR) pumps 16. The residual heat removal pumps 16 provide a pressure head for the primary system fluids as the fluids flow through the piping 18 and into the clean-up system 10. The pressure head needed for operation of the chemical decontamination clean-up system 10 is preferably provided by the residual heat removal pumps 16 since these pumps are already in use in a reactor auxiliary system.

The primary system fluids flowing through the piping 18 are introduced into a valve network 20 which includes a throttle valve 22 and shut off valves 24, 26, 28 and 30. With the valves 24, 26 and 28 in the open position, valve 30 in the closed position and throttle valve 22 either partially or fully open, a portion of the primary system fluids discharged from the residual heat removal pumps 16 are directed to the clean-up system 10 wherein suspended and dissolved solids contained within the primary system fluids are removed.

The suspended and dissolved solids contained within the primary system fluids are generated by a conventional decontamination process. In general, suspended solids or particulates will consist of metals (chromium, iron and nickel) and manganese dioxide. Although the exact quantity of metals will depend upon the crud film thickness, the total quantity will typically be between 400 and 1,000 pounds (180 and 450 kg) for a standard four loop reactor system. In normal operation of the decontamination system, the majority of this mass will be dissolved by the decontamination chemicals. As for the undissolved particulates which form the suspended solids, tests have shown that about 70% of the particulates will be in a range of between 2 and 8 microns, and their concentration within the primary system fluids will be in the range of between 10 and 15 parts per million.

The manganese dioxide contained in the primary system fluids is generated during the alkaline/permanganate step that is common to both the known CAN-DEREM and LOMI chemical decontamination processes. It was originally thought to be desirable to remove all manganese dioxide in particulate form rather than allowing it to become a dissolved solid. Since the expected particle size of the manganese dioxide is in a range of between 0.7 and 1.7 microns, filtration had heretofore been believed to be the preferred removal process. After further evaluation, however, it has been determined that manganese dioxide filtration is, in most instances, neither practical nor economical. It has been determined that the manganese dioxide is best treated chemically with oxalic acid, which is injected into the clean-up system 10 via a chemical injection pump 33. The oxalic acid chemically reacts with the manganese dioxide carried by the primary system fluids circulating through the clean-up system 10. The oxalic acid reduces the manganese dioxide to manganous ions and these manganous ions are removed by ion exchange within downstream demineralizer resin beds.

Regarding the removal of suspended solids or particulates from the primary system fluids, based on the relatively high particulate or solids concentration, it had been thought that the large volume of solids would normally have an adverse affect on these downstream demineralizer resin beds in terms of excessive pressure drop or coating of the resins. Therefore, it was believed to be preferable to remove at least a substantial portion of the suspended solids via a filtering system prior to utilization of any ion-exchange beds. However, it has been determined that the removal of suspended solids prior to utilization of any ion-exchange beds is not required. Eliminating the initial filtering system does not adversely affect the clean-up system 10 so long as a sufficient number of ion-exchange beds are utilized during the clean-up process. For example, for a conventional 4 loop reactor system, it has been found that a minimum of 14 ion-exchange beds are required. Properly quantifying the total amount of resin and demineralizer vessels required for the clean-up process eliminates the need to backflush the demineralizers during operation of the clean-up system 10 and allows the operators of the clean-up system 10 to postpone resin bed replacement until after the clean up process is complete.

After the primary system fluids have passed through the piping 18 and the open valves 24, 28, the fluids are directed via piping 32 to a network of first demineralizer banks generally designated by the numeral 34. The network of first demineralizer banks 34 includes one or more cation demineralizer banks 36 which may be selectively chosen by means of the plurality of upstream and downstream valves 38. If desired, the cation demineralizer banks 36 may be totally bypassed using bypass piping 40 and valve 42. The cation demineralizer banks 36 are operable to remove metals such as iron, chromium and nickel, and radioactive materials, such as cobalt and cesium, which are dissolved by the decontamination chemicals, as well as manganous ions and cation species of the decontamination chemicals themselves. In addition to demineralizing primary system fluids flowing through each of the cation demineralizer banks via ion-exchange, each of the demineralizer banks 36 also serves to some degree as a filtration device. Within the cation demineralizer banks 36, larger solids suspended in the primary system fluids are removed as they are trapped within the resin beds of the individual demineralizers forming each bank 36.

After passage through the cation demineralizer banks 36, the primary system fluids are directed via the piping 44 to an anion demineralizer bank 46 which also forms a portion of the network of first demineralizer banks 34. The anion demineralizer bank 46 is used primarily to remove the anionic species of the decontamination chemicals. As with each of the cation demineralizer banks 36, the anion demineralizer bank 46 also serves as a filtration device to trap solids suspended in the primary system fluids. If desired, the anion demineralizer bank may also be bypassed using bypass piping 48 and valve 50.

Eliminating the need to replace resin beds during the clean-up process eliminates the potential delays in the overall decontamination process due to equipment malfunctions or operator errors in operating the resin replacement subsystems during the decontamination process (i.e., on critical path). Delays are obviously very costly due to the impact on the utilities outage schedule. Another advantage of the demineralizer arrangement described above is the segregation of cation and anion resins in separate demineralizers. In known systems which included approximately nine demineralizer vessels, cation and anion resins were mixed in certain demineralizer vessels. Although this arrangement provides acceptable ion exchange performance, resin performance is less than optimum. That is, ion exchange is slightly more efficient, when for example, process fluids are directed through separate cation and anion beds in series rather than directed through one demineralizer with both cation and anion resins mixed. In addition, this system also provides the flexibility of using only cation or anion resin in the event that unexpected chemistry conditions occur which must be corrected using the resins.

When used with a CAN-DEREM chemical decontamination process, the cation and anion demineralizer banks 36, 46 are arranged as shown in FIG. 1. Two of the cation demineralizer banks 36 are utilized for the alkaline/permanganate steps and the third bank, containing vessels referred to as REGEN beds, are dedicated to the regeneration step (when 70–80% of the curies will be removed from the primary system fluids). When the CANDEREM chemical decontamination process is utilized on a four loop reactor system, primary system fluids may be treated without replacing the cation and anion demineralizer bank resin beds. When operating with the LOMI chemical decontamination process, the same two banks of cation demineralizer banks 36 can be used. The REGEN beds are not required for the LOMI decontamination process.

After passage through the anion demineralizer bank 46, the primary system fluids are directed via the piping 52 to a "finish" demineralizer bank 54 wherein the primary system fluids are "polished" to remove substantially all of the dissolved solids (trace levels of dissolved solids) from the primary system fluids. Finish demineralizer bank 54 includes two demineralizers each containing mixed resin, i.e., a mixture of cation and anion resins. If desired, the finish demineralizer bank 54 may be totally bypassed using the bypass piping 56 and bypass valve 58.

After the primary system fluids are demineralized within the cation and anion demineralizer banks 36, 46, and finish demineralized in the demineralizer bank 54, they are returned to the primary system 12 via a return apparatus generally designated by the numeral 60. Return apparatus 60 includes a pair of resin traps 62 connected in parallel flow relationship. The traps resin 62 may be selectively placed in the clean-up system 10 by operation of the upstream and downstream valves 64. Each trap resin 62 is designed to prevent large quantities of resin from entering the reactor primary system in the event that any of the upstream individual demineralizer vessels forming each of the banks 36, 46 and 54 fail. Typically, only one of the resin traps 62 is on line at any given time.

After passing through at least one of the resin traps 62, the primary system fluids are directed via the piping 66 to a pair of filters 68. Each of the filters 68 is preferably a high dirt-holding capacity depth filter in a pre-shielded container, and at least two filters 68 are recommended so that one can serve as a backup while the other is in service. Each of the filters 68 includes upstream and downstream valves 70 so that an individual filter 68 can be operated, or maintenance performed thereon, independently of the operation of the other filter 68. One preferred filter media is polypropylene or glass fiber. Pleated paper is typically not acceptable because the decontamination chemicals of the standard processes will dissolve the paper. The filters will typically have a nominal rating of 3 microns or less to allow for fine filtration of solids suspended in the primary system fluids. This nominal 3 micron rating is acceptable since, as previously described, larger particles suspended in the primary system fluids are trapped within the resin beds of the network of first demineralizer banks 34 and the finish demineralizer bank 54. After the primary system fluids pass through the filter 68, these fluids are reintroduced into the primary system 12 by piping 72, open valve 26 and piping 73.

As seen in FIG. 1, each of the cation demineralizer banks 36 and the anion demineralizer bank 46 is formed from three individual demineralizers 74 connected in parallel flow relationship. The finish demineralizer bank 54 is formed from a pair of individual demineralizers 74 connected in parallel flow relationship. Each of the individual demineralizers 74 in the clean-up system 10 is arranged in order to optimize a variety of factors including: total resin volume requirements; resin bed removal after primary system fluids clean-up; adequate flow rate to achieve the proper clean-up within a viable time period; use of multiple units for operating flexibility and ease of transport; and proper resin loading. The arrangement and number of individual demineralizers 74 are selected so that no resin bed replacement is required during the operation of the clean-up system. The amount of resin loading should allow for sufficient residence time to obtain efficient ion exchange. It is preferable to achieve roughly 99% removal of any chemicals injected within the primary system in less than about 8 hours. Thus, a flow rate in the range of between 1,000 and 1,500 gallons (38,000–57,000 liters) per minute will be necessary for a system volume of approximately 100,000 gallons (380 cubic meters).

The clean-up system 10 is operable to remove suspended and dissolved solids from the primary system fluids subjected to a chemical decontamination process. As previously described, the number of demineralizer banks utilized within the clean-up system 10 is chosen so that resin bed replacement is not necessary until the primary system fluids clean-up is complete. Further, since the demineralizer beds themselves are utilized to trap larger suspended solids, filtering primary system fluids prior to demineralization is not required. For an in-depth explanation of the operation of the clean-up system 10 and each of the individual demineralizers 74, reference is made to copending patent application Ser. No. 07/983,503, filed Nov. 30, 1992, now U.S. Pat. No. 5,325,410, which is assigned to the assignee of the present invention and incorporated herein by reference.

Figure 2:
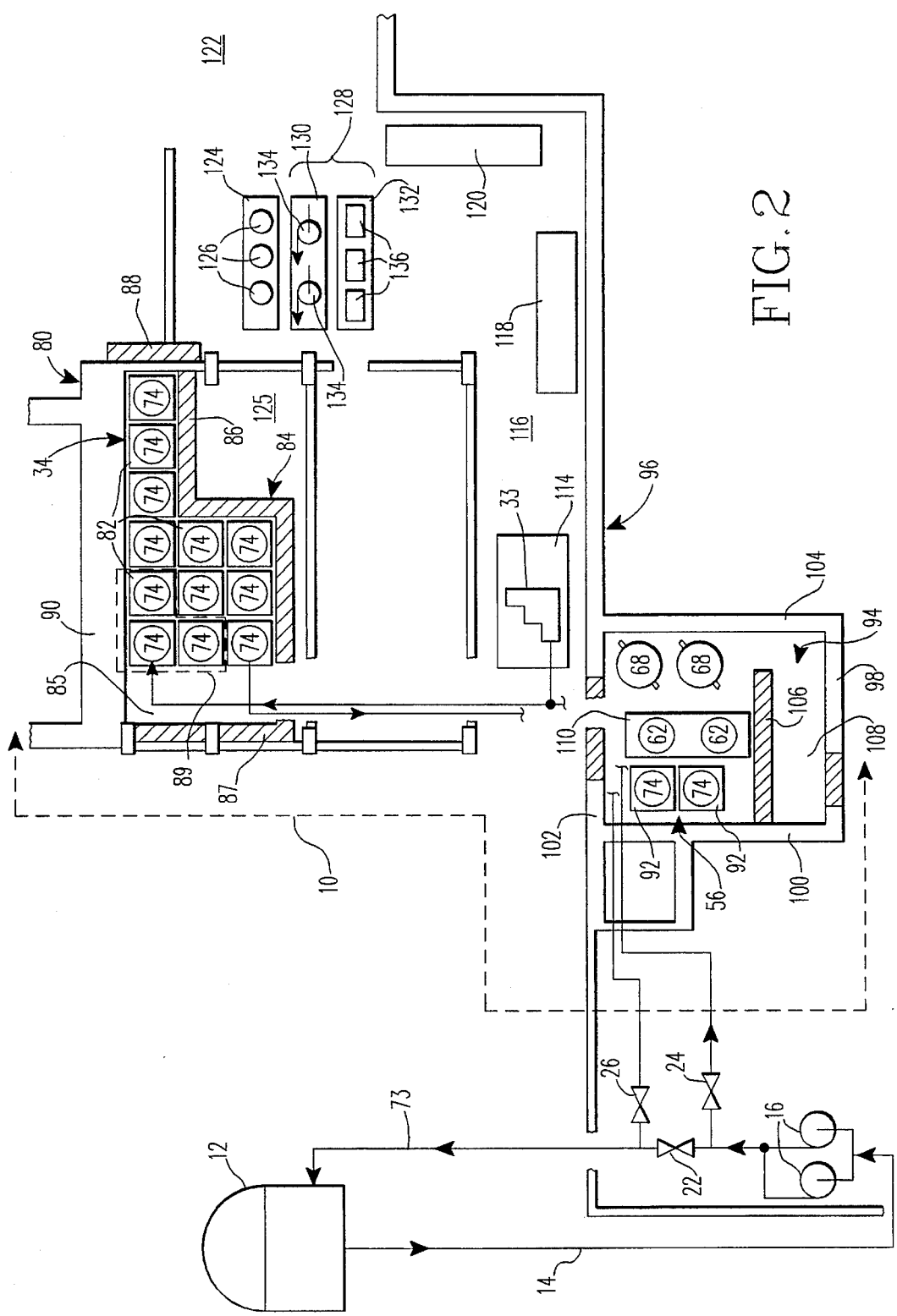
FIG. 2 is a schematic illustration of the components of the chemical decontamination clean-up system of FIG. 1 arranged in accordance with the layout scheme of the present invention.

Now referring to FIG. 2, the various components of the chemical decontamination clean-up system 10 described with reference to FIG. 1 are illustrated schematically and located outside of containment in existing on-site support buildings and areas adjacent to the support buildings. As seen in FIG. 2, the primary system or containment chamber 12 provides primary system fluids via piping 14 to the pair of residual heat removal pumps 16. As described with reference to FIG. 1, the primary system fluids exiting the pair of residual heat removal pumps 16 pass through open valve 24 and into the chemical decontamination clean-up system 10. Since FIG. 2 is presented to illustrate the layout of the various components of the clean-up system 10, all piping and valving extending between various components of the clean-up system 10 have been eliminated for clarity.

The layout configuration of the present invention as illustrated in FIG. 2 provides for supplying the components necessary for full system decontamination clean-up in divisible units. In most instances, these units are placed upon skids which are easily transported by tractor/trailers to the reactor site. These components are also easily installed and dismantled for removal when not in use. Another key design feature of the present invention is that almost all of the individual components forming the cleanup system 10 can fit upon an individual skid, or a plurality of skids which would be situated in close proximity to one another. Since the chemical decontamination clean-up process on a full scale basis may only be needed two to three times per reactor life, a particular nuclear facility using the clean-up system may desire to remove the equipment when not in use. Therefore, a modular design facilitates easy component set-up and removal.

The preferred outside of containment layout design utilizing existing on-site support buildings is shown in FIG. 2 for a typical 4-loop pressurized water nuclear reactor. In this layout design, skid positions are established for various components forming the decontamination clean-up system. Those components handling the radioactive fluids are positioned within shielded rooms in existing on-site support buildings, while those components of the clean-up system 10 which do not contain radioactive primary system fluids are located outside of the buildings.

As seen in FIG. 2, the network of first demineralizer banks generally designated by the numeral 34 is positioned within a fuel storage building 80 which forms a portion of the nuclear power plant. Each of the individual demineralizers 74 of the cation banks 36 and anion bank 46 is positioned on an individual skid 82 located within a shielded room 84 of the fuel storage building 80 and defined by the temporary shields 86, 87, and the building wall 90. As seen in FIG. 2, three of the individual demineralyzers are positioned within a dotted-line box 89. These three demineralizers 74, which form the REGEN bed referred to with regard to FIG. 1, are located in the left corner 85 of the shielded room 84 since they will accumulate most of the dissolved radioactivity and will be shielded from personnel within the fuel storage building providing 80 by the remaining demineralyzers 74 within the room 84. The temporary shields 86, 87, 88 are formed from a twenty-four inch thick concrete or equivalent wall and the building wall 90 is six feet thick. The shielded room 84 is equipped with floor drains and a retaining curb extending around the perimeter of the room as well known in the art to collect and contain radioactive fluids in the event any of the individual demineralizers 74 or piping/valve arrangements experience leakage.

The individual demineralizers 74 forming the second or finish demineralizer bank 56 are positioned on skids 92 located in a shielded room 94 forming a portion of the nuclear power plant primary auxiliary building 96. The shielded room 94 is defined by the walls 98, 100, 102 and 104. The walls 98, 100 and 102 are formed from twenty-four inch thick concrete or equivalent. The wall 104 is formed from thirty-six inch thick concrete or equivalent. An additional twenty-four inch thick concrete or equivalent shield wall 106 is positioned within the shielded room 94 so that no direct line of site exists between the pair of individual demineralizers 74 positioned on the skids 92 and the outer area 108 of the shielded room 94.

Also positioned within the shielded room 94 are the pair of resin traps 62 and the pair of filters 68. Both of the resin traps 62 are positioned on a skid 110. The individual demineralizers 74 positioned on the skids 92 are located adjacent to the wall 100, the pair of filters 68 are located adjacent to the wall 104 and the pair of resin traps 62 positioned on the skids 110 are disposed between the pair of demineralizers 74 and the pair of filters 68.

As is evident from FIG. 2, those components of the clean-up system 10 which handle radioactive fluids are positioned within the shielded rooms 84 and 94. Those components of the clean-up system 10 which do not directly come in contact with radioactive fluids are located outside the shielded rooms 84, 94. For example, the chemical injection pump 33 utilized to inject oxalic acid into the primary system is positioned on a trailer 114 located in an outdoor corridor 116 extending between the fuel storage building 80 and the primary auxiliary building 96. In addition, a trailer 118 which houses electrical control equipment utilized to operate the various electrically controlled valves of the clean-up system 10 and also houses monitoring equipment may also be located within the outdoor corridor 116. A motor control trailer 120 which houses electrical starters for the various motors used in clean-up system 10 may be positioned in the corridor 116 or in an outdoor staging area 122.

As previously described with reference to FIG. 1, the clean-up system 10 utilizes a sufficient number of individual demineralizers 74 such that resin replacement is not required during the chemical decontamination clean-up process. As a result, spent resin storage tanks typically used with prior clean-up systems are not required. Prior to chemical decontamination clean-up, each of the individual demineralizers 74 are devoid of resin. Prior to commencing decontamination clean-up operations, a portable device such as a trailer 124 carrying one or more fresh resin containers 126 is parked in the staging area 122. The trailing 124 is then moved into the truck bay 125 and the individual resin containers 126 are connected via suitable piping (not shown) to the individual demineralizers 74 located in both the fuel storage building 80 and the primary auxiliary building 96. Thereafter, fresh resin is either pumped as a scurry into the individual demineralizers 74 or pulled in under vacuum. In this manner, each of the individual demineralizers 74 may be filled remotely. After each of the individual demineralizers 74 is filled with resin, the individual containers 126 may be disconnected from the fill piping and the trailer 124 removed from the truck bay 125 and the staging area 122.

After the chemical decontamination clean-up process is complete, a second portable unit generally designated by the numeral 128 is initially positioned in the staging area 122. The second portable unit 128 includes a pair of trailers 130 and 132 which are then moved into the truck bay 125. The trailer 130 carries one or more pumps schematically illustrated by the numerals 134 which are connected with each of the individual demineralizers 74 in the fuel storage building 80 and primary auxiliary building 96 via suitable piping (not shown). The pumps 134 are operable to pump sluicing water through one or more of the individual demineralizers 74 to flush out the spent resin contained within the selected demineralizers 74 after clean-up is complete. The spent resin/sluicing water mix is returned from the selected demineralizers 74 to high integrity containers 136 positioned on the trailer 132. The high integrity containers 136 are shielded and thus contain radioactivity within their interiors. When the high integrity containers are filled, they may be removed from the staging area 122 and transported to a burial site for final disposal.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

We claim:

1. In a nuclear reactor including a primary system, a fuel storage building, a primary auxiliary building and a chemical decontamination clean-up system including a chemical injection system for use in cleaning primary system fluids flowing through the nuclear reactor primary system, a layout plan for locating various components of said chemical decontamination cleanup system in said nuclear reactor, comprising the steps of:

a) locating a plurality of first demineralizer banks formed from three banks of cation demineralizers connected in parallel flow relationship and a single bank of anion demineralizers connected in series flow relationship with said three banks of cation demineralizers in a shielded room within said fuel storage building and flow coupling said plurality of first demineralizer banks to said nuclear reactor primary system for receiving said primary system fluids from said primary system;

b) locating a second demineralizer bank in a shielded room within said primary auxiliary building and flow coupling said second demineralizer bank to said plurality of first demineralizer banks for receiving said primary system fluids from said plurality of first demineralizer banks; and c) locating a return means in said primary auxiliary building and flow coupling said return means to said second demineralizer bank for directing said primary system fluids from said second demineralizer bank to said nuclear reactor primary system.

2. The layout plan for locating various components of a chemical decontamination cleanup system in a nuclear reactor as recited in claim 1, including the substep of forming each of said three banks of cation demineralzers from three individual cation demineralizers connected in parallel flow relationship and positioning each of said cation demineralizers on an individual skid in said shielded room within said fuel storage building.

3. The layout plan for locating various components of a chemical decontamination cleanup system in a nuclear reactor as recited in claim 1, including the substep of forming said single bank of anion demineralizers from three individual anion demineralzers connected in parallel flow relationship and positioning each of said anion demineralizers on an individual skid in said shielded room within said fuel storage building.

4. The layout plan for locating various components of a chemical decontamination cleanup system in a nuclear reactor as recited in claim 1, including the substep of forming said return means from a pair of resin traps located downstream from said second demineralizer bank and positioning said pair of resin traps within said shielded room within said primary auxiliary building and a pair of filters downstream from said at least one resin trap and positioning said pair of filters within said shielded room within said primary auxiliary building.

5. The layout plan for locating various components of a chemical decontamination cleanup system in a nuclear reactor as recited in claim 4, including positioning said pair of resin traps in side-by-side relationship on a skid in said shielded room within said primary auxiliary building.

6. The layout plan for locating various components of a chemical decontamination cleanup system in a nuclear reactor as recited in claim 4, including positioning said pair of filters on a skid in said shielded room in said primary auxiliary building adjacent to said pair of resin traps.

7. The layout plan for locating various components of a chemical decontamination cleanup system in a nuclear reactor as recited in claim 1, including forming said second demineralizer bank from two individual finish demineralzers connected in parallel flow relationship and positioning each of said finish demineralizers on a skid in said shielded room within said primary auxiliary building.

8. The layout plan for locating various components of a chemical decontamination cleanup system in a nuclear reactor as recited in claim 1, including positioning said chemical injection system outdoors between said fuel storage building and said primary auxiliary building and flow coupling said chemical injection system to said primary system upstream from said plurality of first demineralzer banks.

\* \* \* \* \*